(12) United States Patent
Xin et al.

(10) Patent No.: US 11,748,950 B2
(45) Date of Patent: Sep. 5, 2023

(54) DISPLAY METHOD AND VIRTUAL REALITY DEVICE

(71) Applicant: Huawei Technologies Co., Ltd., Shenzhen (CN)

(72) Inventors: Xin Xin, Shanghai (CN); Weixi Zheng, Shenzhen (CN); Xueyan Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 32 days.

(21) Appl. No.: 17/090,642

(22) Filed: Nov. 5, 2020

(65) Prior Publication Data

US 2021/0056756 A1 Feb. 25, 2021

Related U.S. Application Data

(63) Continuation of application No. PCT/CN2019/099271, filed on Aug. 5, 2019.

(30) Foreign Application Priority Data

Aug. 14, 2018 (CN) .......................... 201810922645.9

(51) Int. Cl.
*G06T 19/00* (2011.01)
*G06F 40/279* (2020.01)
(Continued)

(52) U.S. Cl.
CPC .............. *G06T 19/00* (2013.01); *G06F 3/165* (2013.01); *G06F 40/279* (2020.01); *G06V 20/653* (2022.01); *H04L 12/282* (2013.01)

(58) Field of Classification Search
CPC ....... G96T 19/00; G06F 40/279; G06F 3/165; G06V 20/653; H04L 12/282
(Continued)

(56) References Cited

U.S. PATENT DOCUMENTS 10,509,257 B2   12/2019  Li
2002/0021297 A1*  2/2002  Weaver .................. G06Q 10/00
                                                   345/420
(Continued)

FOREIGN PATENT DOCUMENTS

CN       105975066 A      9/2016
CN       106648096 A      5/2017
(Continued)

OTHER PUBLICATIONS

Chang et al., "SceneSeer: 3D Scene Design with Natural Language," Retrieved from the Internet: URL:https://arxiv.org/pdf/1703.00050.pdf, XP055612384, pp. 1-10 (Feb. 28, 2017).

*Primary Examiner* — Jin Ge
(74) *Attorney, Agent, or Firm* — Leydig, Voit & Mayer, Ltd.

(57) ABSTRACT

A display method is provided, including: generating, by a virtual reality device, a selection instruction for target content in response to an operation of a user; identifying, by the virtual reality device, at least one keyword from the target content according to the selection instruction; obtaining, by the virtual reality device, a target 3D environment model and at least one piece of target 3D environment data through matching based on the at least one keyword and a preset matching rule, where the preset matching rule includes a 3D environment model rule and at least one 3D environment data rule; and applying, by the virtual reality device, the at least one piece of target 3D environment data to the target 3D environment model, to present a corresponding 3D virtual reality environment.

20 Claims, 16 Drawing Sheets

(51) Int. Cl.
  *G06F 3/16* (2006.01)
  *H04L 12/28* (2006.01)
  *G06V 20/64* (2022.01)

(58) Field of Classification Search
  USPC .......................................... 345/419
  See application file for complete search history.

(56) References Cited

U.S. PATENT DOCUMENTS

| | | | |
|---|---|---|---|
| 2006/0041842 A1* | 2/2006 | Loberg | G06T 15/00 715/700 |
| 2008/0071559 A1* | 3/2008 | Arrasvuori | G06F 3/011 705/26.1 |
| 2011/0234591 A1* | 9/2011 | Mishra | G06Q 30/0603 345/426 |
| 2012/0086727 A1* | 4/2012 | Korah | G06F 3/03 345/633 |
| 2014/0253743 A1 | 9/2014 | Loxam et al. | |
| 2018/0203951 A1* | 7/2018 | Jovanovic | G06T 19/006 |
| 2018/0204385 A1* | 7/2018 | Sarangdhar | H04L 12/282 |
| 2018/0205926 A1 | 7/2018 | Mogalapalli et al. | |
| 2018/0218542 A1 | 8/2018 | Nicholas et al. | |
| 2018/0284955 A1* | 10/2018 | Canavor | G06F 16/29 |

FOREIGN PATENT DOCUMENTS

| | | |
|---|---|---|
| CN | 106683201 A | 5/2017 |
| CN | 107665133 A | 2/2018 |
| CN | 107835403 A | 3/2018 |
| CN | 108391445 A | 8/2018 |
| CN | 109324687 A | 2/2019 |
| EP | 3358462 A1 | 8/2018 |

\* cited by examiner

| Environment model | Material mapping | Skysphere | lighting | Particle | Background music | Smart home |
|---|---|---|---|---|---|---|
| Ocean model | Colorful ocean material | Blue sky and white clouds | Weak light | Flame | Sad music | High temperature (such as 25 to 30 degrees) |
| Glacier model | Gray ocean material | Sunset and dusk | Normal light | Smoke | Quiet music | Normal temperature (such as 20 to 25 degrees) |
| Desert model | Colorful deep ocean material | Starry night | Strong light | Spark | Happy music | Low temperature (such as 15 to 20 degrees) |
| Plain model | Gray deep ocean material | Aurora night | | Explosion | Nostalgic music | Strong wind |
| Grassland model | Colorful glacier material | Heavy clouds | | Purple particle | Country music | Normal wind |
| Forest model | Gray glacier material | Darkness | | Blue particle | Healing music | Slight wind |
| Mountain model | Colorful desert material | Vast galaxy | | Green particle | Love music | No wind |
| Valley model | Gray desert material | Meteor shower | | Yellow particle | Inspirational music | Very humid (such as humidity of 60% to 75%) |
| Cave model | Colorful plain material | Fiery | | White particle | Chinese style music | Normally humid (such as humidity of 50% to 60%) |

FIG. 6C

| Environment model | Material mapping | Skysphere | lighting | Particle | Background music | Smart home |
|---|---|---|---|---|---|---|
| Volcano model | Gray plain material | | | Gray particle | Horror music | Dry (such as humidity of 30% to 50%) |
| Mountain cliff model | Colorful grassland material | | | Black particle | | |
| Space model | Gray grassland material | | | Red particle | | |
| Heaven model | Colorful forest material | | | No particle | | |
| Hell model | Gray forest material | | | | | |
| Western European palace model | Colorful mountain material | | | | | |
| Chinese ancient city model | Gray mountain material | | | | | |
| Future city model | Colorful valley material | | | | | |
| More | Gray valley material | | | | | |
| | Colorful cave material | | | | | |
| | Gray cave material | | | | | |

FIG. 6C (continued)

| Environment model | Material mapping | Skysphere | lighting | Particle | Background music | Smart home |
|---|---|---|---|---|---|---|
| | Colorful Volcano material | | | | | |
| | Gray Volcano material | | | | | |
| | Colorful mountain cliff material | | | | | |
| | Gray mountain cliff material | | | | | |
| | Space material | | | | | |
| | Heaven material | | | | | |
| | Hell material | | | | | |
| | Colorful Western European palace material | | | | | |
| | Gray Western European palace material | | | | | |
| | Colorful Chinese ancient city material | | | | | |
| | Gray Chinese ancient city material | | | | | |

FIG. 6C (continued)

| Environment model | Material mapping | Skysphere | Lighting | Particle | Background music | Smart home |
|---|---|---|---|---|---|---|
| | Colorful future city material | | | | | |
| | Gray future city material | | | | | |

FIG. 6C (continued)

DISPLAY METHOD AND VIRTUAL REALITY DEVICE

CROSS-REFERENCE TO RELATED APPLICATIONS

This application is a continuation of International Patent Application No. PCT/CN2019/099271, filed on Aug. 5, 2019, which claims priority to Chinese Patent Application No. 201810922645.9, filed on Aug. 14, 2018. The disclosures of the aforementioned applications are hereby incorporated by reference in their entireties.

TECHNICAL FIELD

This application relates to the field of virtual reality technologies, and in particular, to a display method and a virtual reality device.

BACKGROUND

Currently, main applications of virtual reality (VR) include VR movies, VR games, VR shopping, and the like. A VR user interface usually has a home screen shown in FIG. 1A, for a user to select a specific application. After the specific application is selected, another screen is displayed for the user to select specific content in the application. For example, FIG. 1B is a schematic diagram of a video selection screen displayed after the YouTube (YouTube) application is selected. Alternatively, FIG. 1C is a schematic diagram of a movie selection screen displayed after a movie application is selected.

In the foregoing two screens, there are two types of content. One type of content is foreground content, including icons for selecting various applications (APP) from the home screen and preview images of content in the APPs. The other type of content is background content such as a landscape picture shown in FIG. 1B or a shark picture shown in FIG. 1C. A relationship between the background content and the foreground content is relatively weak, and a three-dimensional sense is also lacking.

In an implementation, to enable a user to be immersed, a common practice in the industry is to substitute a corresponding virtual environment based on different use scenarios such as a home screen, an application store, and a virtual cinema. FIG. 2A is an architectural diagram of an existing process. Oculus is used as an example. A virtual environment on a home screen of Oculus is an open villa environment shown in FIG. 2B. When a Netflix application is selected, the virtual environment is switched to a red home environment, and a large amount of video content is displayed on a television set through simulation of real life, as shown in FIG. 2C. However, the virtual environment implemented is merely to create a static panoramic picture, and the user cannot interact with the virtual environment. Consequently, an interaction characteristic of virtual reality cannot be implemented. In addition, in virtual reality, there is a lack of association between content and a virtual environment, a single virtual environment is used to match a large amount of different content, and imagination is lacking. Meanwhile, in the prior art, one virtual environment is used to match each piece of content, which poses a great challenge to performance of an existing hardware device. For example, a standard-definition static panoramic picture is a file of 3840*3840 pixels, and a size of the file is 15 Mb. For thousands of pieces of content, it cannot be implemented in the prior art that one virtual environment is used to match each piece of content.

SUMMARY

Embodiments of this application provide a display method and a virtual reality device, to perform matching based on a keyword identified from target content selected by a user and a preset matching rule, to obtain a target 3D environment model and at least one piece of target 3D environment data, to present a corresponding 3D virtual reality environment.

In view of this, a first aspect of this application provides a display method. The method may include: generating, by a virtual reality device, a selection instruction for target content in response to an operation of a user, where the target content may be content in a video content list, content in a game content list, content in an application content list, or the like, and is not limited; identifying, by the virtual reality device, at least one keyword from the target content according to the selection instruction, for example, identifying, by the virtual reality device, information such as a label, a feature, an introduction, and a title of the target content according to the selection instruction, to obtain at least one keyword; obtaining, by the virtual reality device, a target 3D environment model and at least one piece of target 3D environment data through matching based on the at least one keyword and a preset matching rule, where there are multiple types of preset matching rules, which may include a 3D environment model rule and at least one 3D environment data rule; and applying, by the virtual reality device, the at least one piece of target 3D environment data to the target 3D environment model, to present a corresponding 3D virtual reality environment.

In this embodiment of this application, the virtual reality device performs matching based on the keyword identified from the target content selected by the user and the preset matching rule, to obtain the target 3D environment model and the at least one piece of target 3D environment data, to present the corresponding 3D virtual reality environment. In this way, a thematic operational requirement of matching content is effectively reduced, and operating manpower/cost expenditure is reduced, and a computing performance requirement on a virtual reality device is also reduced.

Optionally, in some embodiments of this application, the at least one 3D environment data rule includes at least one of a smart home rule, a material mapping rule, a skysphere rule, a lighting rule, a particle rule, and a background music rule. The 3D environment data rule herein includes but is not limited to the foregoing description. In this embodiment of this application, the at least one 3D environment data rule is briefly described, so that the technical solutions of this application are more specific and clearer.

Optionally, in some embodiments of this application, the at least one keyword includes a first target keyword. The obtaining, by the virtual reality device, a target 3D environment model through matching based on the at least one keyword and a preset matching rule may include: when the first target keyword matches the 3D environment model rule, obtaining, by the virtual reality device through matching, a target 3D environment model corresponding to the first target keyword. For example, the target 3D environment model may be an ocean model, a glacier model, a desert model, a plain model, a grassland model, a forest model, a mountain model, a valley model, or the like. In this embodiment of this application, the solution is a specific implementation solution in which the corresponding target 3D environment model is obtained when the first target keyword matches the 3D environment model rule, so that the solution is more feasible.

Optionally, in some embodiments of this application, the at least one 3D environment data rule includes the material mapping rule, the at least one piece of target 3D environment data includes target material mapping data, the at least one keyword includes a second target keyword, and the obtaining, by the virtual reality device, at least one piece of target 3D environment data through matching based on the at least one keyword and a preset matching rule may include: when the second target keyword matches the material mapping rule, obtaining, by the virtual reality device, the target material mapping data through matching. In this embodiment of this application, the solution is a specific implementation solution in which the corresponding target material mapping data is obtained when the second target keyword matches the material mapping rule, so that the solution is more feasible.

Optionally, in some embodiments of this application, the at least one 3D environment data rule includes the skysphere rule, the at least one piece of target 3D environment data includes target skysphere material data, the at least one keyword includes a third target keyword, and the obtaining, by the virtual reality device, at least one piece of target 3D environment data through matching based on the at least one keyword and a preset matching rule may include: when the third target keyword matches the skysphere rule, obtaining, by the virtual reality device, the target skysphere material data through matching. In this embodiment of this application, the solution is a specific implementation solution in which the corresponding target skysphere material data is obtained when the third target keyword matches the skysphere rule, so that the solution is more feasible.

Optionally, in some embodiments of this application, the at least one 3D environment data rule includes the lighting rule, the at least one piece of target 3D environment data includes target lighting data, the at least one keyword includes a fourth target keyword, and the obtaining, by the virtual reality device, at least one piece of target 3D environment data through matching based on the at least one keyword and a preset matching rule may include: when the fourth target keyword matches the lighting rule, obtaining, by the virtual reality device, the target lighting data through matching. In this embodiment of this application, the solution is a specific implementation solution in which the corresponding target lighting data is obtained when the fourth target keyword matches the lighting rule, so that the solution is more feasible.

Optionally, in some embodiments of this application, the at least one 3D environment data rule includes the particle rule, the at least one piece of target 3D environment data includes target particle data, the at least one keyword includes a fifth target keyword, and the obtaining, by the virtual reality device, at least one piece of target 3D environment data through matching based on the at least one keyword and a preset matching rule may include: when the fifth target keyword matches the particle rule, obtaining, by the virtual reality device, the target particle data through matching. In this embodiment of this application, the solution is a specific implementation solution in which the corresponding target particle data is obtained when the fifth target keyword matches the particle rule, so that the solution is more feasible.

Optionally, in some embodiments of this application, the at least one 3D environment data rule includes the background music rule, the at least one piece of target 3D environment data includes target audio file data, the at least one keyword includes a sixth target keyword, and the obtaining, by the virtual reality device, at least one piece of target 3D environment data through matching based on the at least one keyword and a preset matching rule may include: when the sixth target keyword matches the background music rule, obtaining, by the virtual reality device, the target audio file data through matching. In this embodiment of this application, the solution is a specific implementation solution in which the corresponding target audio file data is obtained when the sixth target keyword matches the background music rule, so that the solution is more feasible.

Optionally, in some embodiments of this application, the method may further include: sending, by the virtual reality device, a control instruction to a smart home device, where the control instruction includes the target audio file data, and the target audio file data is used to be played by the smart home device. In this embodiment of this application, when the virtual reality device obtains the target audio file data through matching, the virtual reality device may choose to send the target audio file data to the smart home device, and the smart home device plays the target audio file data, so that the solution is more flexible.

Optionally, in some embodiments of this application, the method may further include: playing, by the virtual reality device, the target audio file data. In this embodiment of this application, when obtaining the target audio file data, the virtual reality device may also choose to play the target audio file data, so that a delay and transmission resources are reduced.

Optionally, in some embodiments of this application, the applying, by the virtual reality device, the at least one piece of target 3D environment data to the target 3D environment model, to present a corresponding 3D virtual reality environment may include: rendering, by the virtual reality device, the 3D virtual reality environment based on the target 3D environment model and the at least one piece of target environment data; and displaying, by the virtual reality device, the 3D virtual reality environment. This embodiment of this application provides a solution in which the virtual reality device presents the 3D virtual reality environment, so that the solution is more feasible.

Optionally, in some embodiments of this application, the method may further include: obtaining, by the virtual reality device, a running parameter of the smart home device through matching based on the at least one keyword and the preset matching rule; and sending, by the virtual reality device, the running parameter of the smart home device to a server, where the running parameter is used by the server to control the smart home device to run based on the running parameter. In this embodiment of this application, the smart home device may be further used for the presented 3D virtual reality environment, so that resources are effectively used, and the user can feel a better effect of being immersed, thereby enhancing user experience.

Optionally, in some embodiments of this application, the running parameter includes at least one of a temperature parameter, a humidity parameter, a wind volume parameter, a wind direction parameter, or an odor parameter. The temperature parameter is used by the server to control the smart home device to run based on the temperature parameter, the humidity parameter is used by the server to control the smart home device to run based on the humidity parameter, the wind volume parameter and the wind direction parameter are used by the server to control the smart home device to run based on the wind volume parameter in a wind direction corresponding to the wind direction parameter, and the odor parameter is used by the server to control the smart home device to emit a corresponding odor. In this embodiment of this application, the running parameter of the smart home device and a corresponding function are described, and temperature, humidity, wind, sound, and the like are adjusted based on content in virtual reality (virtual reality, VR) by using a smart home system, thereby effectively enhancing multi-sensory experience of the user and also reducing space and price costs of virtual reality multi-sensory experience.

Another aspect of the embodiments of this application provides a virtual reality device, to implement a function of obtaining a target 3D environment model and at least one piece of target 3D environment data through matching based on a keyword identified from target content selected by a user, to present a corresponding 3D virtual reality environment. The function may be implemented by hardware, or may be implemented by hardware by executing corresponding software. The hardware or the software includes one or more modules corresponding to the function.

Still another aspect of the embodiments of this application provides a virtual reality device. The virtual reality device may include a transceiver, configured to communicate with an apparatus other than the virtual reality device; a memory, configured to store a computer executable instruction; and one or more processors, connected to the memory and the transceiver through a bus. The processor executes the computer executable instruction stored in the memory and one or more computer programs, where the one or more computer programs are stored in the memory, and the one or more computer programs include an instruction. When the instruction is executed by the virtual reality device, the virtual reality device performs the method according to any one of the first aspect and the optional manners of the first aspect.

Still another aspect of the embodiments of this application provides a wireless communications apparatus. The wireless communications apparatus may include:

at least one processor, a memory, a transceiver circuit, and a bus system, where the processor, the memory, and the transceiver circuit are coupled through the bus system, the wireless communications apparatus communicates with a remote access unit by using the transceiver circuit, the memory is configured to store a program instruction, and the at least one processor is configured to execute the program instruction stored in the memory, so that the wireless communications apparatus performs some of the operations of the virtual reality device in the method according to the first aspect of the embodiments of this application. The wireless communications apparatus may be a virtual reality device, or may be a chip that is applied to a virtual reality device and used to perform a corresponding function.

Still another aspect of the embodiments of this application provides a storage medium. It should be noted that the technical solutions of this application essentially, or a part contributing to the prior art, or all or some of the technical solutions may be implemented in a form of a software product. The computer software product is stored in a storage medium, configured to store a computer software instruction used by the foregoing virtual reality device, where the computer software instruction includes a program designed for executing the foregoing aspects by the virtual reality device.

The storage medium includes: any medium that can store program code, such as a USB flash drive, a removable hard disk, a read-only memory (ROM), a random access memory (RAM), a magnetic disk, or an optical disc.

Still another aspect of the embodiments of this application provides a computer program product including an instruction. When the instruction runs on a computer, the computer performs the method according to any one of the foregoing aspects and the optional implementations of the aspects.

BRIEF DESCRIPTION OF DRAWINGS

To describe the technical solutions in the embodiments of this application more clearly, the following briefly describes the accompanying drawings for describing the prior art or the embodiments. The accompanying drawings in the following description show merely some embodiments of this application, and other drawings may still be derived from these accompanying drawings.

FIG. 6C is a schematic diagram of various results that can match various matching rules;

DESCRIPTION OF EMBODIMENTS

Embodiments of this application provide a display method and a virtual reality device, to perform matching based on a keyword identified from target content selected by a user and a preset matching rule, to obtain a target 3D environment model and at least one piece of target 3D environment data, to present a corresponding 3D virtual reality environment.

To make persons skilled in the art understand the solutions of this application better, the following describes the technical solutions in the embodiments of this application with reference to the accompanying drawings in the embodiments of this application. Clearly, the described embodiments are merely some rather than all of the embodiments of this application. All embodiments based on this application shall fall within the protection scope of this application.

Figure 1A:
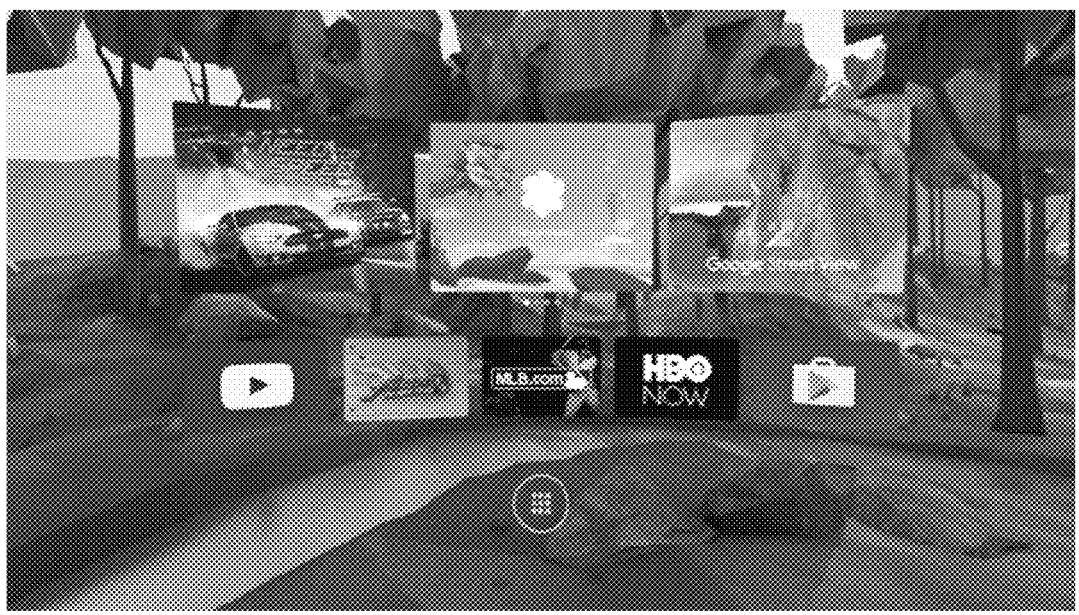
FIG. 1A is a schematic diagram of displaying a home screen by a virtual reality device.
Figure 1B:
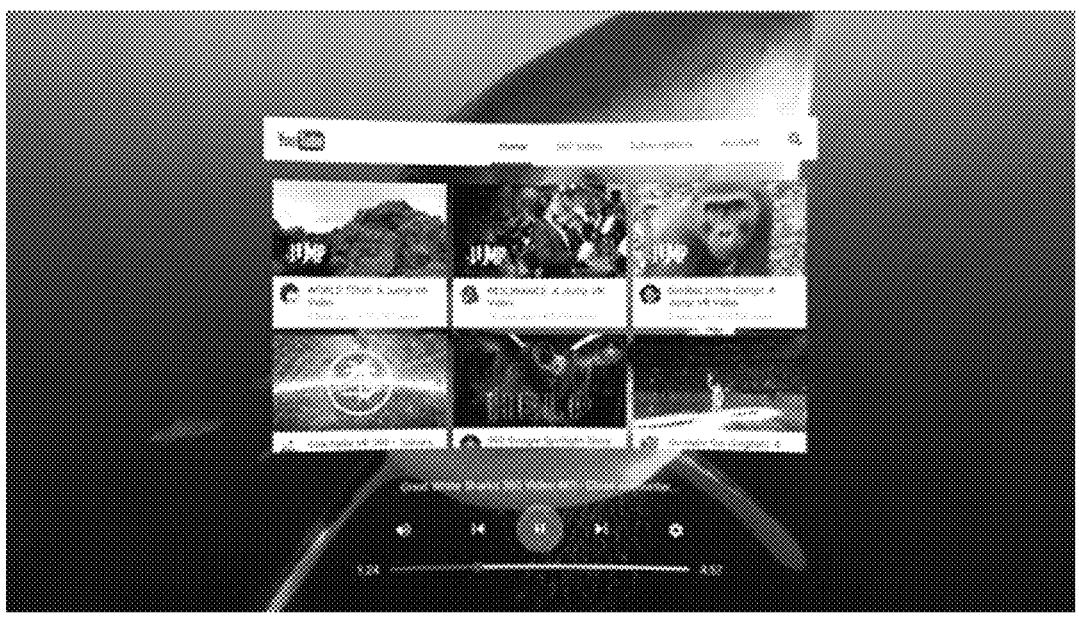
FIG. 1B is a schematic diagram of a video selection screen displayed after the YouTube application is selected.
Figure 1C:
FIG. 1C is a schematic diagram of a movie selection screen displayed after a movie application is selected.
Figure 2A:
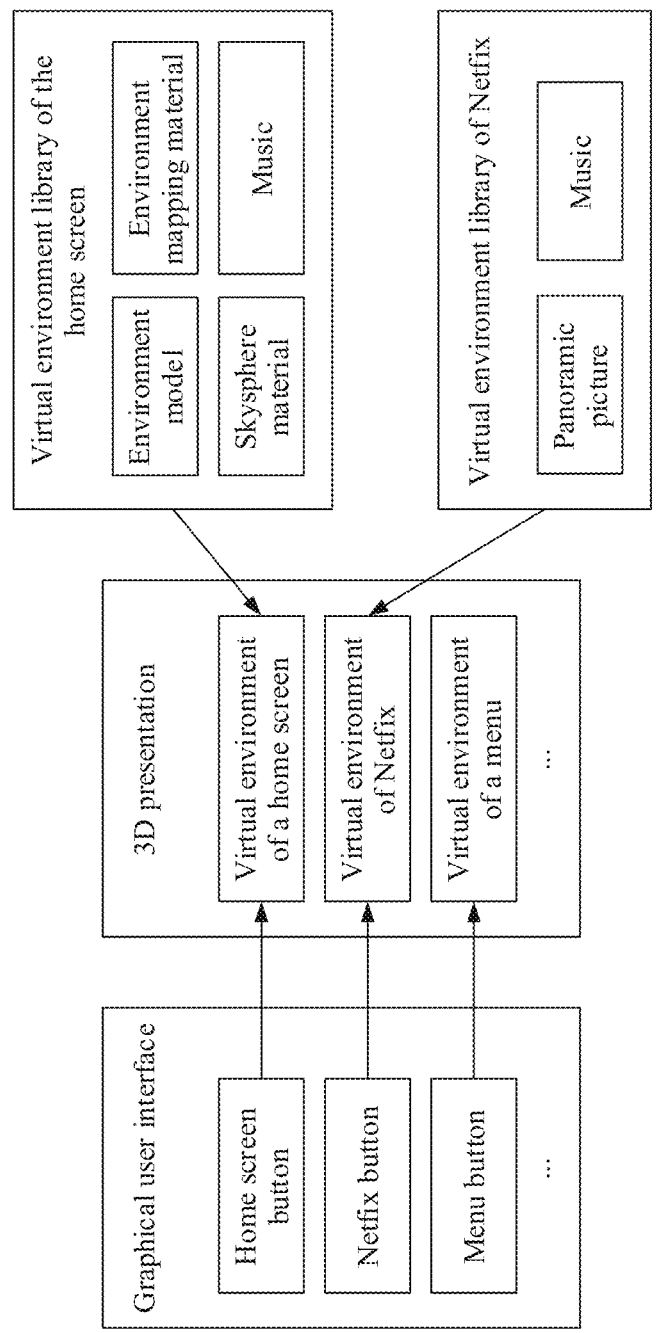
FIG. 2A is an architectural diagram of an existing process.
Figure 2B:
FIG. 2B is a schematic diagram of displaying a virtual environment on a home screen in the prior art.
Figure 2C:
FIG. 2C is a schematic diagram of displaying a virtual environment in the prior art.
Figure 3:
FIG. 3 is a schematic diagram of existing immersive experience.

In an implementation, a virtual reality device may further use an external mechanical device in combination with content to increase a plurality of types of sensory experience, for example, provide multi-sensory immersive experience for a user by using smell, smoke, rain, and fog, vibration of a seat, and the like. For example, in racing game experience, a user may perform manipulation by using a steering wheel or the like in a control module. An input module in a virtual environment is responsible for receiving an instruction of the control module and providing feedback to racing program logic. Based on a manipulation status of the user, the racing program logic sends an instruction to enable a mechanical seat to vibrate or be lifted or lowered depending on a driving status. FIG. 3 is a schematic diagram of existing immersive experience.

The prior art has the following disadvantages: The technology is applicable only to a public entertainment scenario. In addition to specific experience space, a large external mechanical device is further required. Therefore, a problem of high costs exists. In addition, the mechanical device has less matching content and high maintenance costs, is inconvenient to move, and so on, which is not conducive to popularizing VR content.

The following first briefly describes terms in this application as follows:

Virtual reality: In virtual reality, a virtual world in three-dimensional space is generated through computer simulation, to provide simulated visual, auditory, haptic, and other senses for users, so that the users can feel as if they were in the environment and can observe things in the three-dimensional space without limitation in a timely manner.

Inertial measurement unit: An inertial measurement unit is an apparatus for measuring three-axis posture angles (or angular velocities) and accelerations of an object. Generally, one inertial measurement unit (IMU) includes three single-axis accelerometers and three single-axis gyroscopes. The accelerometers detect acceleration signals of an object on independent three axes of a carrier coordinate system, and the gyroscopes detect angular velocity signals of a carrier relative to a navigation coordinate system, measure an angular velocity and an acceleration of the object in three-dimensional space, and calculate a posture of the object.

3D engine: A 3D engine abstracts materials in reality into polygons or various curves or other representation forms, and implements a set by using algorithms for performing related calculation in a computer and outputting a final image. Generally, as an underlying tool, the 3D engine supports higher-layer graphics software development. The 3D engine seems to build a "real world" in a computer.

Three-dimensional model: A three-dimensional model is a polygon representation of an object, and is usually displayed by using a computer or another video device. The displayed object may be an entity in the real world, or may be an imaginary object. The three-dimensional model is often generated by using special-purpose software such as a three-dimensional modeling tool, but can also be generated by using another method. As data of a set of points and other information, the three-dimensional model may be manually generated, or may be generated based on a specific algorithm.

Material mapping: In computer graphics, material mapping, also referred as texture mapping, means wrapping a bitmap stored in a memory around a surface of a 3D rendered object. Texture mapping provides rich details for the object and simply simulates a complex appearance. An image (texture) is pasted (mapped) onto a simple body in a scene, as if a print is pasted on a plane.

Lighting system: A lighting system is also referred to as an illumination system, and the lighting system is used to bring a light source to a scene, to illuminate the scene.

Rendering: Rendering in computer graphics is a process of generating an image from a model by using software. The model is a description of a three-dimensional object in a strictly defined language or data structure, and includes geometry, viewpoint, texture, and illumination information.

Content label: A content label refers to main information of content, is used to identify the content, and includes a category, duration, a producer, a keyword, and an introduction of the content.

Figure 4:
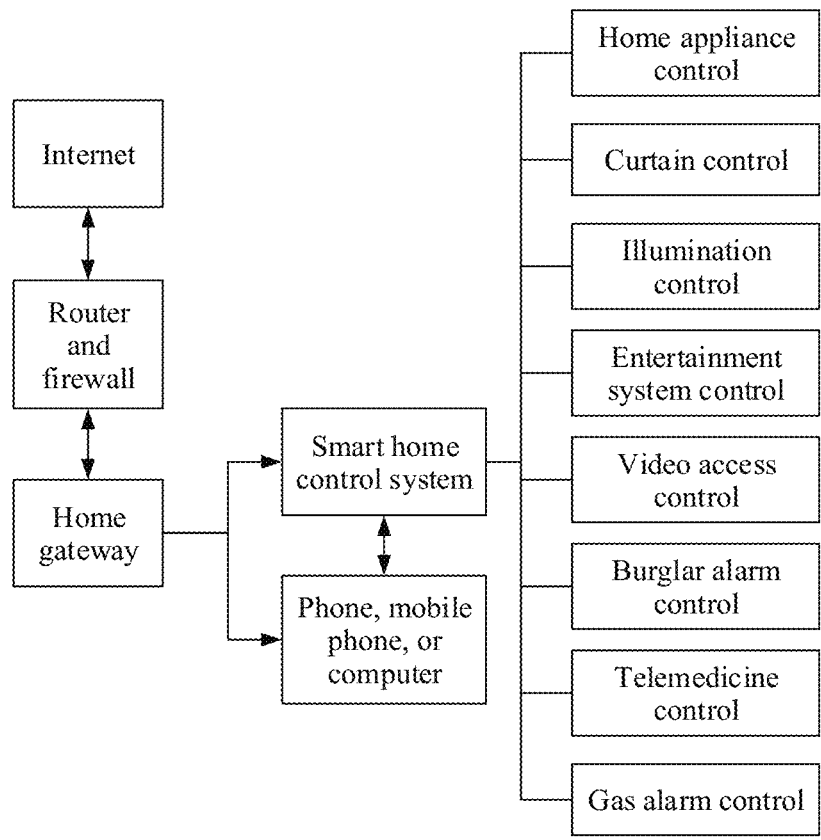
FIG. 4 is a schematic diagram in which a smart home control system connects various devices.

Smart home: A smart home is an embodiment of connection of things under impact of the internet. FIG. 4 is a schematic diagram in which a smart home control system connects various devices. To be specific, the smart home control system connects various home devices (for example, an audio/video device, an illumination system, curtain control, air conditioner control, a digital cinema system, a media server, a video cabinet system, and network home appliances) together by using an internet of things technology, and provides a plurality of functions and means such as home appliance control, illumination control, indoor and outdoor remote control, environment monitoring, heating, ventilation, and air conditioning control, and programmable timing control. The smart home control system can perform control after being connected by using a phone, a mobile phone, a computer, or the like.

In the technical solutions of this application, the virtual reality device may include a browsing information region (foreground content) and a virtual environment layer (background content). When a user does not select content, a virtual environment presents a preset default environment. After the user selects one piece of content, the virtual reality device identifies a content label selected by the user, generates a virtual environment matching the content label, and sends the content label to the smart home control system. A terminal device in the smart home control system runs based on the content label. This application is intended to resolve a problem that an undiversified fixed background environment cannot meet a content matching requirement and a problem of how to address diversified virtual environment requirements of a user in limited system resource environments.

It should be noted that, depending on different functions, virtual reality systems may be classified into four types: an immersive virtual reality system, an augmented virtual reality system, a desktop virtual reality system, and a distributed virtual reality system. This patent mainly relates to the immersive virtual reality system, and a common immersive system is a system based on a head-mounted display.

Figure 5:
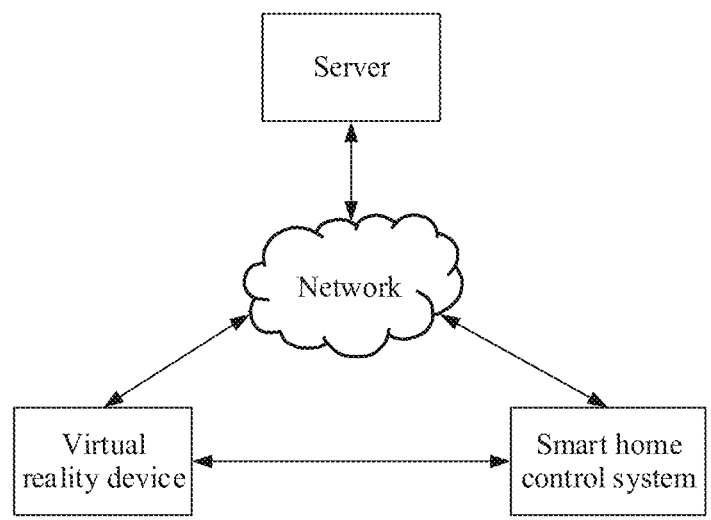
FIG. 5 is a diagram of a system architecture to which this application is applied.

FIG. 5 is a diagram of a system architecture to which this application is applied. In this application, a virtual reality device is configured to present a virtual object, such as an environment, weather, and a sound effect, generated by a system. The virtual reality device may include but is not limited to a terminal with various head-mounted displays isolating visual and auditory senses of a person from the outside, a controller that can control and interact with display content, a virtual reality integrated headset, a virtual reality headset connected to a mobile phone end, and a virtual reality headset connected to a computer end.

The virtual reality device is connected, through a network, to a server that provides various services, and the server may be a server that provides a cloud service, a social networking server, or the like. The virtual reality device can provide feedback to the server based on an operation of a user.

A smart home control system may comprehensively manage home appliances, an air conditioning system, floor heating, curtain control, light control, humidity control, and the like by using a network, and the home system may be connected to the virtual reality device in a Bluetooth manner, an infrared manner, or the like.

Figure 6A:
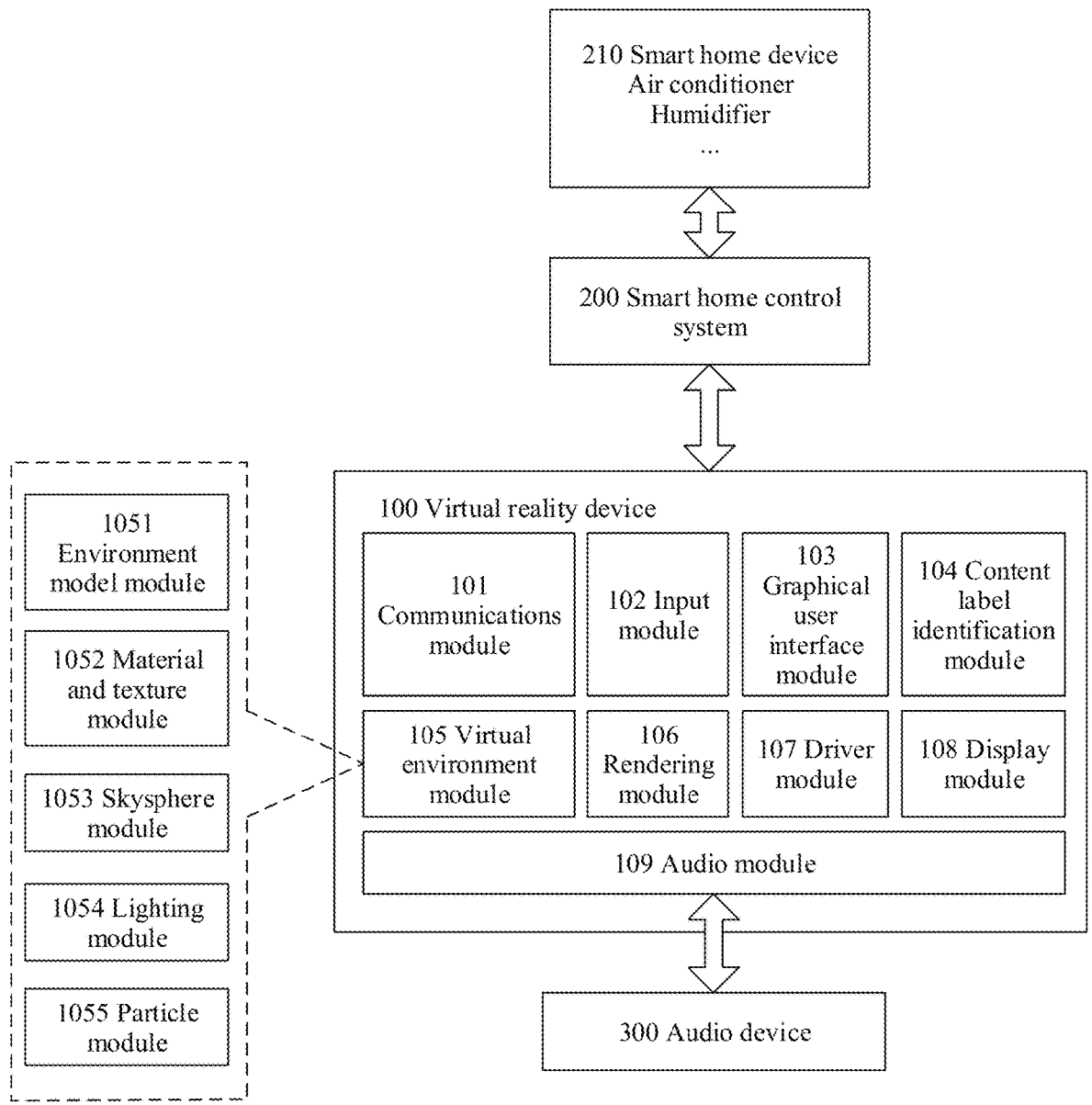
FIG. 6A is a schematic diagram in which a virtual reality device is connected to a smart home control system and an audio device according to an embodiment of this application.

FIG. 6A is a schematic diagram in which a virtual reality device is connected to a smart home control system and an audio device according to an embodiment of this application. A virtual reality device 100 may include but is not limited to the following function modules: a communications module 101, an input module 102, a graphical user interface module 103, a content label identification module 104, a virtual environment module 105, a rendering module 106, a driver module 107, a display module 108, and an audio module 109.

The function modules are described as follows:

The communications module 101 may receive, in a communication manner such as a cellular, Ethernet, Wireless Fidelity (Wi-Fi), Bluetooth, or infrared manner, an instruction or information sent by another device, and may also send data of the virtual reality device to a cloud, a network, a system, or another device. The communications module 101 can perform information transmission with a smart home control system 200.

The input module 102 may send operation instruction information to the graphical user interface module 103 in an input manner, for example, through a gesture, a handle, a voice, or a touchpad.

The graphical user interface module 103 is configured to create an operation interface such as a card, a text, or a button that interacts with a user in a three-dimensional object.

Figure 6B:
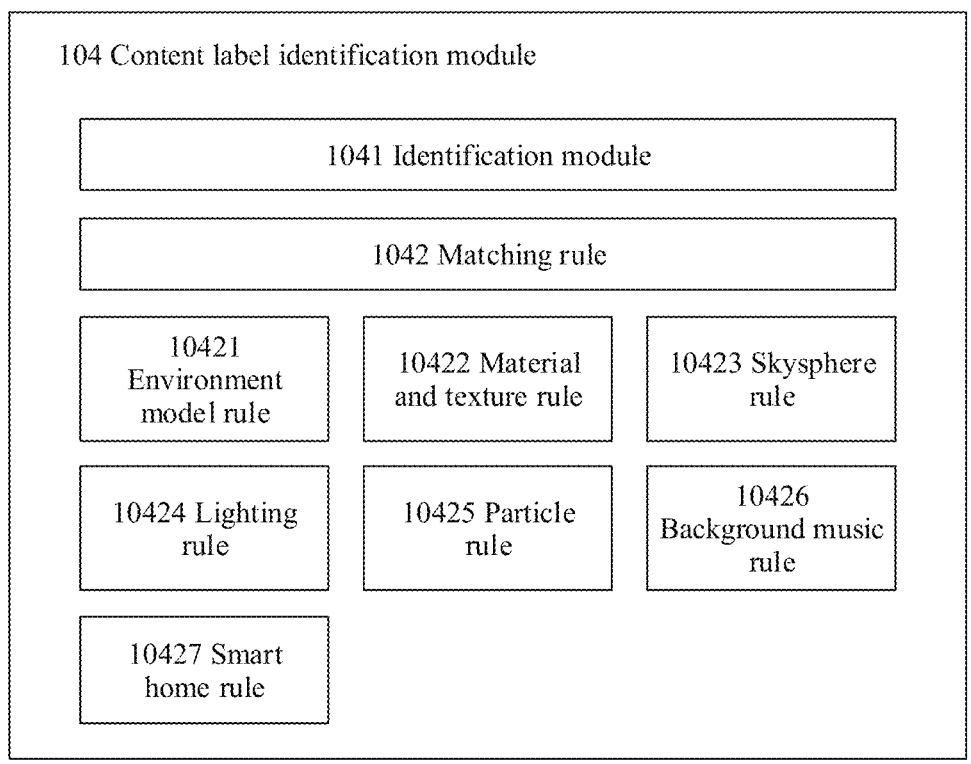
FIG. 6B is a schematic diagram of function modules in a content label identification module.

As shown in FIG. 6B, the content label identification module 104 may include an identification module 1041 and a matching rule 1042, and can match a content identification result and a corresponding virtual environment based on the matching rule to obtain a matching result, and separately send corresponding instructions to the virtual environment module 105 and the audio module 109 based on the matching result.

The identification module 1041 is configured to identify a keyword in information such as a label, a feature, an introduction, and a title of content.

The matching rule 1042 may include but is not limited to a (3D) environment model rule, a material mapping rule, a skysphere rule, a lighting rule, a particle rule, a background music rule, and a smart home rule. In this application, the matching rule is a rule used to perform matching on the identified keyword to obtain a target 3D environment model and target 3D environment data, in other words, the matching rule defines a mapping relationship between the keyword and both the target 3D environment model and the target 3D environment data. Specific implementation of the matching rule is not limited, and the matching rule may be implemented by using various software and hardware methods.

For example, the matching rule is implemented through search or a regular expression. In this application, there may be multiple types of matching rules, including a 3D environment model rule and at least one 3D environment data rule.

FIG. 6C is a schematic diagram of various results that can match various matching rules. For example, an environment model involved in the 3D environment model rule may include an ocean model, a glacier model, and the like. Each column shown in material mapping, skysphere, lighting, particle, background music, and smart home represents categories of all pieces of environment data in the 3D environment data rule. The following separately describes various rules.

An environment model rule 10421, namely, the 3D environment model rule, is used to select a corresponding model based on an environment keyword appearing in a title, a label, an introduction, or a content description. A mountain model is used as an example. A keyword for selecting the mountain model may include but is not limited to associated texts such as "mountain range", "mountain peak", "mountaineer", or "climb a mountain".

The following rules all belong to the 3D environment data rule.

A material mapping rule 10422 is used to identify a movie emotion type from a title, a label, an introduction, or a content description based on a selected environment model, and select a corresponding material. A gray material keyword is a negative emotion keyword description, and may include but is not limited to sadness, grief, anger, tension, anxiety, pain, fear, hatred, death, and the like. If the foregoing negative emotion keywords do not exist, it may be considered by default that the material is a colorful material.

A skysphere rule 10423 is used to select a corresponding skysphere material based on a keyword appearing in a title, a label, an introduction, or a content description. For example, if a keyword "space" appears, "vast galaxy" is selected.

A lighting rule 10424 is used to perform classification based on keywords appearing in a title, a label, an introduction, or a content description, and then select corresponding light intensity. Strong light is used as an example. If a positive emotion keyword such as "comedy" or "youth" appears, the strong light is selected. On the contrary, when a negative emotion keyword such as "thriller" or "horror" appears, weak light is selected.

A particle rule 10425 is used to adjust and control a corresponding particle parameter based on a keyword appearing in a title, a label, an introduction, or a content description. "Flame particle" is used as an example. If a keyword such as "fire" or "fire disaster" occurs, the flame particle is selected because the keyword is directly associated with flame. Alternatively, a corresponding particle parameter is selected based on an indirectly associated keyword. "White particle" is used as an example. If a keyword such as "peak", "snow peak", or "first mountain peak" appears, the white particle is selected because the keyword is indirectly associated with a white color.

A background music rule 10426 is used to select a corresponding audio file based on a keyword appearing in a title, a label, an introduction, or a content description. "Horror music" is used as an example. If a keyword such as "ghost" or "haunted house" appears, the horror music is selected.

A smart home rule 10427 is used to set a running parameter of a smart home device based on a keyword appearing in a title, a label, an introduction, or a content description. The running parameter of the smart home device includes temperature, humidity, a wind volume, a wind direction, a curtain opening/closing degree, an emitted odor, and the like.

The temperature is used as an example. When a keyword, such as "Amazon", "virgin forest", "volcano", "Africa", or "hot", associated with high temperature appears, the high temperature is selected. The wind volume is used as another example. If a keyword such as "hurricane" or "typhoon" appears, strong wind is selected. Alternatively, when a keyword "thriller" or "ghost story" is included in keywords, an air conditioner is turned on to set low temperature and slight wind. Alternatively, when a keyword "desert" is included in keywords, a radiant floor heating device is turned on to set relatively high temperature. Alternatively, when a keyword "flower" is included in keywords, a device that can emit an odor is turned on to set a floral type to emit an odor.

The virtual environment module 105 is configured to process all components of the virtual environment, and may include an environment model module 1051, a material and texture module 1052, a skysphere module 1053, a lighting module 1054, a particle module 1055, and a physical model module.

The environment model module 1051 selects a corresponding environment model according to an instruction.

The material and texture module 1052 controls a material and texture of a three-dimensional model according to an instruction.

The skysphere module 1053 selects a material of a sky environment according to an instruction.

The lighting module 1054 controls a lighting system parameter, such as a position, intensity, or a color of a light source, or a quantity of light sources, of the virtual environment according to an instruction.

The particle module 1055 controls an attribute, such as a color, a size, a speed, a cycle time, and transparency, of a particle according to an instruction.

The rendering module 106 is configured to graphically render and encapsulate data of each virtual three-dimensional object. The 3D rendering module mainly manages an entire 3D engine. A main camera of a scene determines objects to be rendered and sends them through a rendering pipeline. The 3D engine encapsulates finally rendered details, and the rendering module 106 further provides access to pixel and vertex shaders.

The driver module 107 drives a graphics card to perform an operation, to perform graphic output on data rendered by the rendering module 106.

The display module 108 presents a rendered graphical user interface to the user in the virtual reality device.

The audio module 109 presents an audio file to the user in the virtual reality device.

The smart home control system 200 is configured to control a device in the smart home control system 200, for example, adjust and control temperature and a wind volume of an air conditioner.

A smart home device 210 executes an instruction object delivered from the smart home control system 200, and may include but is not limited to a home appliance (for example, an air conditioner or a humidifier), a curtain, a door, a device that can emit an odor, and the like.

An audio device 300 is a device, such as a speaker/sound system, configured to play an audio file for the user.

Figure 7:
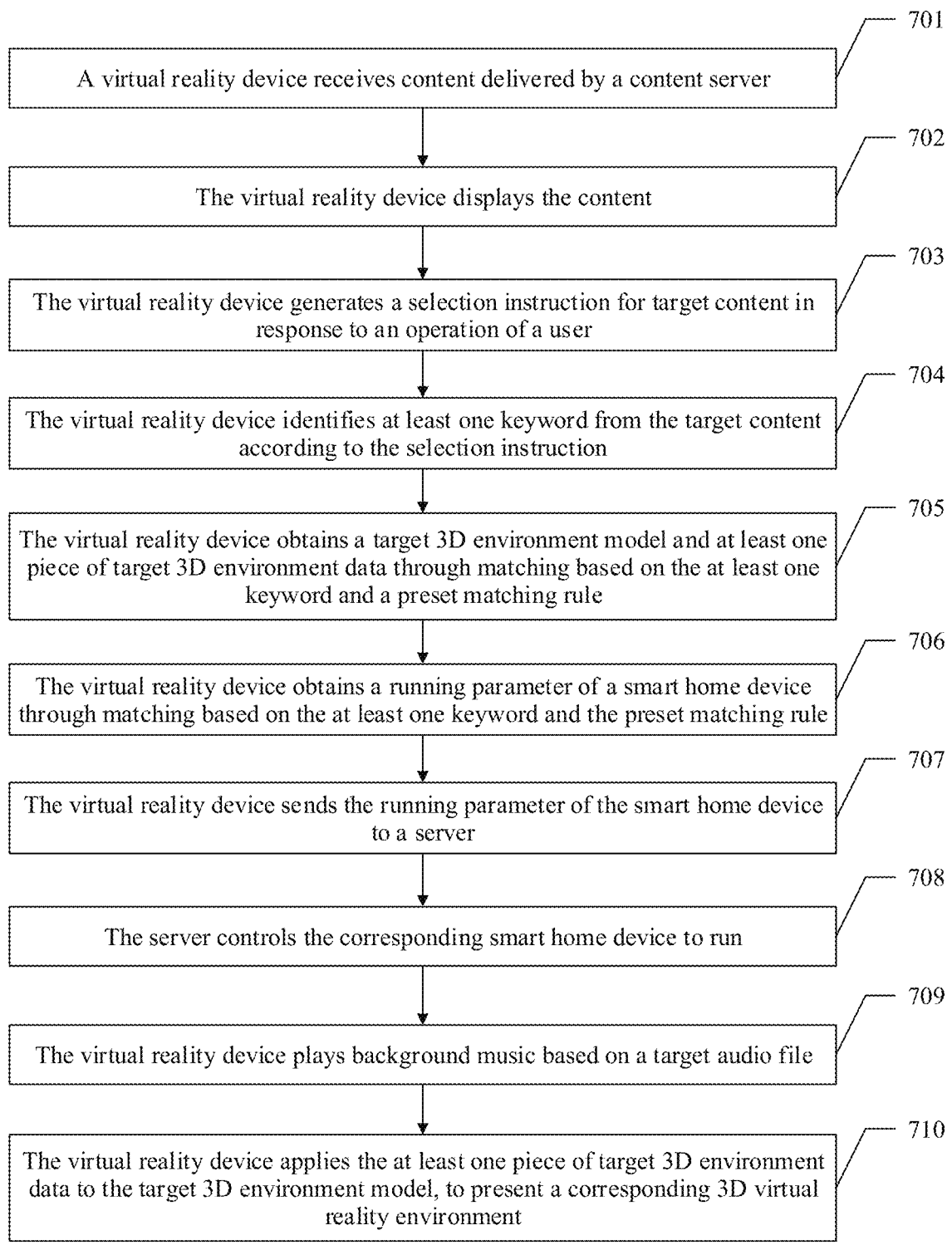
FIG. 7 is a schematic diagram of an embodiment of a display method according to the embodiments of this application.

The following further describes the technical solutions of this application through embodiments. FIG. 7 is a schematic diagram of an embodiment of a display method according to the embodiments of this application. The method may include the following steps.

Step 701: A virtual reality device receives content delivered by a content server. To be specific, a communications module 101 in the virtual reality device receives the content delivered by the content server. For example, the content may be a video content list, a game content list, an application content list, or the like, and is not limited.

Step 702: The virtual reality device displays the content. To be specific, a graphical user interface module 103 in the virtual reality device presents the content.

It should be noted that steps 701 and 702 are optional steps.

Step 703: The virtual reality device generates a selection instruction for target content in response to an operation of a user.

To be specific, the user selects the target content from the content by using an input module 102 in the virtual reality device, to generate the selection instruction. For example, the user selects video content of "Meru" from the video content list by using the input module 102 in the virtual reality device, to generate the selection instruction.

Step 704: The virtual reality device identifies at least one keyword from the target content according to the selection instruction.

An identification module 1041 in a content label identification module 104 in the virtual reality device identifies the at least one keyword from information such as a label, a feature, an introduction, and a title of the target content according to the selection instruction.

For example, the identification module 1041 in the content label identification module 104 in the virtual reality device identifies at least one keyword from information such as a label, a feature, an introduction, and a title of "Meru" according to the selection instruction. Video information of "Meru" is as follows: A type is "documentary/adventure/action/sports", a location is "USA/India", and the introduction is "Three elite climbers struggle to find their way through obsession and loss as they attempt to climb Mount Meru, one of the most coveted prizes in the high stakes game of Himalayan big wall climbing." Keywords identified from the foregoing information are "climb", "Meru Peak", "adventure/action/sports", "climber", "harsh environment", and "Himalayas".

Step 705: The virtual reality device obtains a target 3D environment model and at least one piece of target 3D environment data through matching based on the at least one keyword and a preset matching rule.

A matching rule 1042 in the content label identification module 104 in the virtual reality device obtains the target 3D environment model and the at least one piece of target 3D environment data through matching based on the identified at least one keyword and the preset matching rule. To be specific, the matching rule 1042 performs matching on the target content based on the at least one keyword "climb", "Meru Peak", "adventure/action/sports", "climber", "harsh environment", and "Himalayas".

The preset matching rule includes a 3D environment model rule and at least one 3D environment data rule. It may be understood that the at least one 3D environment data rule may include at least one of a smart home rule, a material mapping rule, a skysphere rule, a lighting rule, a particle rule, and a background music rule.

For details of matching based on the at least one keyword and the preset matching rule, refer to the following description.

(1) The at least one keyword includes a first target keyword. The obtaining, by the virtual reality device, a target 3D environment model through matching based on the at least one keyword and a preset matching rule may include: when the first target keyword matches the 3D environment model rule, obtaining, by the virtual reality device through matching, a target 3D environment model corresponding to the first target keyword.

For example, an environment model rule 10421 selects the target 3D environment model based on the first target keyword, and delivers a first instruction to an environment model module 1051. For example, the environment model rule 10421 selects a mountain model based on the keywords "climb", "Meru Peak", "climber", and "Himalayas" associated with the mountain model, and then delivers the first instruction to the environment model module 1051.

(2) The at least one 3D environment data rule includes the material mapping rule, the at least one piece of target 3D environment data includes target material mapping data, the at least one keyword includes a second target keyword, and the obtaining, by the virtual reality device, at least one piece of target 3D environment data through matching based on the at least one keyword and a preset matching rule may include: when the second target keyword matches the material mapping rule, obtaining, by the virtual reality device, the target material mapping data through matching.

For example, a material mapping rule 10422 selects the target material mapping data based on the second target keyword, and then delivers a second instruction to a material and texture module 1052. For example, the material mapping rule 10422 selects a colorful mountain material based on a case in which there is no negative emotion keyword, and then delivers the second instruction to the material and texture module 1052.

(3) The at least one 3D environment data rule includes the skysphere rule, the at least one piece of target 3D environment data includes target skysphere material data, the at least one keyword includes a third target keyword, and the obtaining, by the virtual reality device, at least one piece of target 3D environment data through matching based on the at least one keyword and a preset matching rule may include: when the third target keyword matches the skysphere rule, obtaining, by the virtual reality device, the target skysphere material data through matching.

For example, a skysphere rule 10423 selects the target skysphere material data based on the third target keyword, and then delivers a third instruction to a skysphere module 1053. For example, the skysphere rule 10423 selects a skysphere of heavy clouds based on the keyword "harsh environment", and then delivers the third instruction to the skysphere module 1053.

(4) The at least one 3D environment data rule includes the lighting rule, the at least one piece of target 3D environment data includes target lighting data, the at least one keyword includes a fourth target keyword, and the obtaining, by the virtual reality device, at least one piece of target 3D environment data through matching based on the at least one keyword and a preset matching rule may include: when the fourth target keyword matches the lighting rule, obtaining, by the virtual reality device, the target lighting data through matching.

For example, a lighting rule 10424 selects the target lighting data based on the fourth target keyword, and then delivers a fourth instruction to a lighting module 1054. For example, the lighting rule 10424 selects weak light based on the keyword "harsh environment", and then delivers the fourth instruction to the lighting module 1054.

(5) The at least one 3D environment data rule includes the particle rule, the at least one piece of target 3D environment data includes target particle data, the at least one keyword includes a fifth target keyword, and the obtaining, by the virtual reality device, at least one piece of target 3D environment data through matching based on the at least one keyword and a preset matching rule may include: when the fifth target keyword matches the particle rule, obtaining, by the virtual reality device, the target particle data through matching.

For example, a particle rule 10425 selects the target particle data based on the fifth target keyword, and then delivers a fifth instruction to a particle module 1055. For example, the particle rule 10425 selects a white particle parameter based on the keyword "Himalayas", and then delivers the fifth instruction to the particle module 1055.

(6) The at least one 3D environment data rule includes the background music rule, the at least one piece of target 3D environment data includes target audio file data, the at least one keyword includes a sixth target keyword, and the obtaining, by the virtual reality device, at least one piece of target 3D environment data through matching based on the at least one keyword and a preset matching rule may include: when the sixth target keyword matches the background music rule, obtaining, by the virtual reality device, the target audio file data through matching.

For example, a background music rule 10426 selects a target background music file data name based on the sixth target keyword, and then delivers a sixth instruction to an audio module 109. For example, the background music rule 10426 selects an inspirational background music based on the keywords "adventure", "sports", and "coveted", and then delivers the sixth instruction to the audio module 109.

In conclusion, a virtual environment module 105 in the virtual reality device may adjust the environment model module 1051, the material and texture module 1052, the skysphere module 1053, the lighting module 1054, and the particle module 1055 according to corresponding instructions. Optionally, the audio module 109 in the virtual reality device selects a corresponding background music file according to the sixth instruction and the background music file name. For example, the audio module 109 selects an inspirational background music file based on the background music file name.

Optionally, in a running process of steps 703 and 704, because smart identification inevitably has a problem of accuracy, a unified interface may also be provided, a type of a matching rule and an execution time are preset by a content provider, and the matching rule is delivered to a corresponding device for execution when content is being played. For example, for VR movie content "Nie Xiaoqian", it is preconfigured by using the interface that when the movie is played for 25 minutes and 36 seconds, an air conditioner is started, temperature is set to "low", and a wind volume is set to "slight", so that a user is more aware of a gloomy atmosphere. For another example, if a movie includes a plot where a doorbell rings, it is preconfigured by using the interface that when the movie is played to the time point, an instruction is sent to a doorbell of a door in a smart home to enable the doorbell to ring, so that a user feels that the doorbell of the home of the user rings, thereby making the user be more immersed.

Step 706: The virtual reality device obtains a running parameter of a smart home device through matching based on the at least one keyword and the preset matching rule.

A smart home rule 10427 obtains the running parameter of the smart home device based on a seventh target keyword and the smart home rule. For example, the smart home rule 10427 selects terminal parameters of low temperature and strong wind based on the keywords "Meru Peak", "Himalayas", and "harsh environment", and then delivers a seventh instruction to a smart home control system 200.

Step 707: The virtual reality device sends the running parameter of the smart home device to a server.

The running parameter is used by the server to control the smart home device to run based on the running parameter. To be specific, the smart home rule 10427 sets the running parameter of the smart home device based on a keyword appearing in a title, a label, an introduction, or a content description, and then delivers the seventh instruction to the smart home control system 200. The running parameter is used by the server to control the smart home control system to run. It may be understood that the smart home control system 200 may be considered as the server.

Step 708: The server controls the corresponding smart home device to run.

The running parameter includes at least one of a temperature parameter, a humidity parameter, a wind volume parameter, a wind direction parameter, an odor parameter, and a curtain opening/closing degree parameter.

The temperature parameter is used by the server to control the smart home device to run based on the temperature parameter, the humidity parameter is used by the server to control the smart home device to run based on the humidity parameter, the wind volume parameter and the wind direction parameter are used by the server to control the smart home device to run based on the wind volume parameter in a wind direction corresponding to the wind direction parameter, and the odor parameter is used by the server to control the smart home device to emit a corresponding odor.

After receiving the seventh instruction, the server requires a smart home device 210 to start to run based on the running parameter in the seventh instruction. If the smart home device is currently running, the server may adjust a configuration of the smart home device based on the running parameter in the seventh instruction. For example, an air conditioner terminal device in the smart home device 210 runs in low temperature and a strong wind mode.

Step 709: The virtual reality device plays background music based on a target audio file.

It may be understood that the background music may be played on the virtual reality device based on the target audio file in the sixth instruction; or the virtual reality device sends the sixth instruction to an audio device 300, and the background music is played on the standalone audio device 300 based on the target audio file in the sixth instruction. The audio device 300 may also belong to the smart home device.

It should be noted that steps 706 to 709 are optional steps.

Step 710: The virtual reality device applies the at least one piece of target 3D environment data to the target 3D environment model, to present a corresponding 3D virtual reality environment.

The virtual reality device renders the 3D virtual reality environment based on the target 3D environment model and the at least one piece of target environment data, and the virtual reality device displays the 3D virtual reality environment. To be specific, a rendering module 106 in the virtual reality device graphically renders and encapsulates data of each three-dimensional object in the virtual reality environment. A driver module 107 in the virtual reality device drives a graphics card to perform an operation, to perform graphic output on data rendered by the rendering module 106, and deliver the graphic output to a display module 108.

Figure 8:
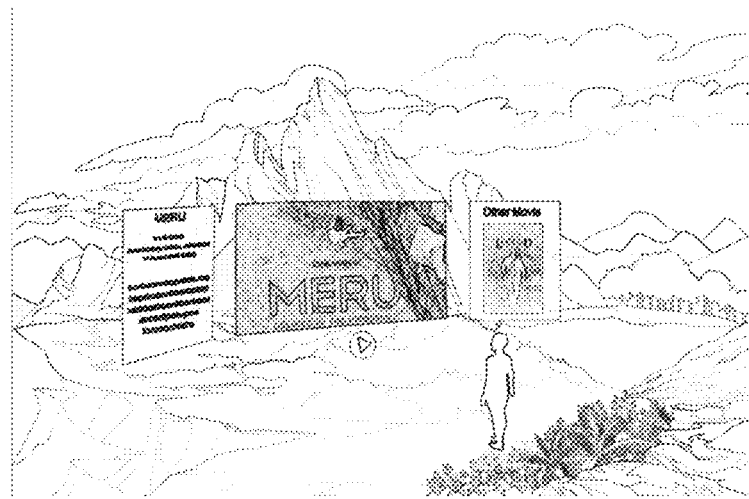
FIG. 8 is a schematic diagram of a graphical user interface presented by a virtual reality device.

For example, the rendering module 106 in the virtual reality device may perform graphic rendering based on the mountain model indicated in the first instruction, the colorful mountain material indicated in the second instruction, the skysphere of heavy clouds indicated in the third instruction, the weak light indicated in the fourth instruction, and data corresponding to the white particle indicated in the fifth instruction. The display module 108 in the virtual reality device presents a rendered graphical user interface to the user. FIG. 8 is a schematic diagram of a graphical user interface presented by a virtual reality device.

In the embodiments of this application, unlike a background image or a virtual environment produced in advance in the prior art, in this application, diversified combinational virtual reality environment rendering methods such as an environment model and material mapping are used to effectively reduce a thematic operational requirement of matching content and reduce operating manpower/cost expenditure. A computing performance requirement on a virtual reality device is also reduced. Temperature, humidity, wind, sound, and the like are adjusted based on content in VR by using a smart home system, thereby effectively enhancing multi-sensory experience of a user and also reducing space and price costs of virtual reality multi-sensory experience.

Figure 9A:
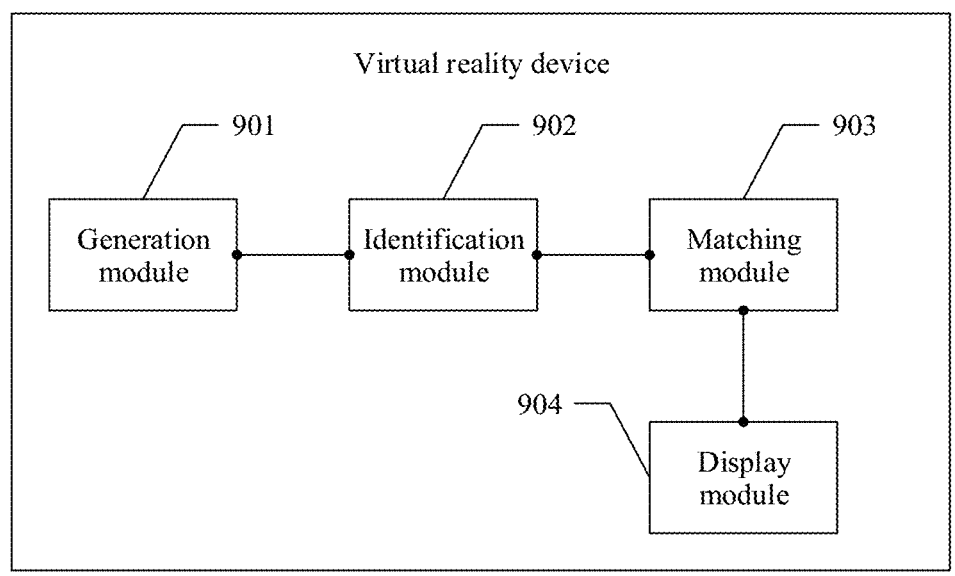
FIG. 9A is a schematic diagram of an embodiment of a virtual reality device according to the embodiments of this application.

FIG. 9A is a schematic diagram of an embodiment of a virtual reality device according to the embodiments of this application. The virtual reality device may include:

a generation module 901, configured to generate a selection instruction for target content in response to an operation of a user;

an identification module 902, configured to identify at least one keyword from the target content according to the selection instruction;

a matching module 903, configured to obtain a target 3D environment model and at least one piece of target 3D environment data through matching based on the at least one keyword and a preset matching rule, where the preset matching rule includes a 3D environment model rule and at least one 3D environment data rule; and a display module 904, configured to apply the at least one piece of target 3D environment data to the target 3D environment model, to present a corresponding 3D virtual reality environment.

Optionally, in some embodiments of this application, the at least one 3D environment data rule includes at least one of a smart home rule, a material mapping rule, a skysphere rule, a lighting rule, a particle rule, and a background music rule.

Optionally, in some embodiments of this application, the at least one keyword includes a first target keyword; and the matching module 903 is configured to: when the first target keyword matches the 3D environment model rule, obtain a target 3D environment model corresponding to the first target keyword.

Optionally, in some embodiments of this application, the at least one 3D environment data rule includes the material mapping rule, the at least one piece of target 3D environment data includes target material mapping data, and the at least one keyword includes a second target keyword; and the matching module 903 is configured to: when the second target keyword matches the material mapping rule, obtain the target material mapping data through matching.

Optionally, in some embodiments of this application, the at least one 3D environment data rule includes the skysphere rule, the at least one piece of target 3D environment data includes target skysphere material data, and the at least one keyword includes a third target keyword; and the matching module 903 is configured to: when the third target keyword matches the skysphere rule, obtain the target skysphere material data through matching.

Optionally, in some embodiments of this application, the at least one 3D environment data rule includes the lighting rule, the at least one piece of target 3D environment data includes target lighting data, and the at least one keyword includes a fourth target keyword; and the matching module 903 is configured to: when the fourth target keyword matches the lighting rule, obtain the target lighting data through matching.

Optionally, in some embodiments of this application, the at least one 3D environment data rule includes the particle rule, the at least one piece of target 3D environment data includes target particle data, and the at least one keyword includes a fifth target keyword; and the matching module 903 is configured to: when the fifth target keyword matches the particle rule, obtain the target particle data through matching.

Optionally, in some embodiments of this application, the at least one 3D environment data rule includes the background music rule, the at least one piece of target 3D environment data includes target audio file data, and the at least one keyword includes a sixth target keyword; and the matching module 903 is configured to: when the sixth target keyword matches the background music rule, obtain the target audio file data through matching.

Figure 9B:
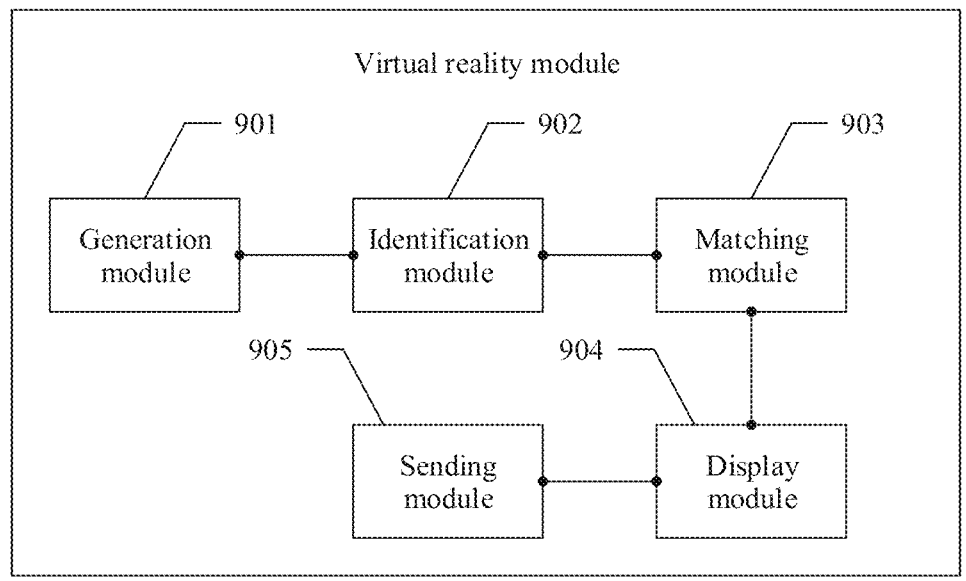
FIG. 9B is a schematic diagram of an embodiment of a virtual reality device according to the embodiments of this application.

Optionally, in some embodiments of this application, refer to FIG. 9B. FIG. 9B is a schematic diagram of an embodiment of a virtual reality device according to the embodiments of this application. The virtual reality device further includes:

a sending module 905, configured to send a control instruction to a smart home device, where the control instruction includes the target audio file data, and the target audio file data is used to be played by the smart home device.

Figure 9C:
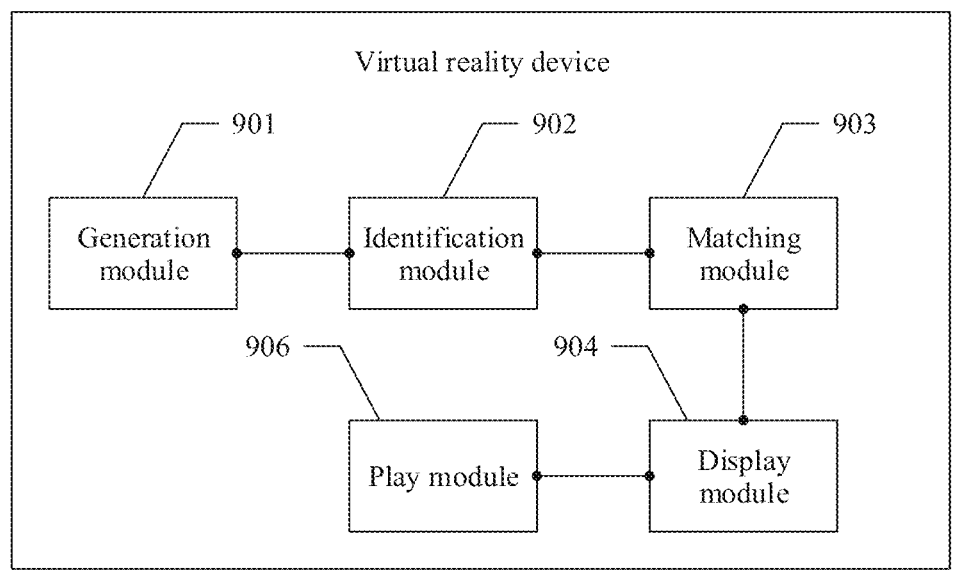
FIG. 9C is a schematic diagram of an embodiment of a virtual reality device according to the embodiments of this application.

Optionally, in some embodiments of this application, refer to FIG. 9C. FIG. 9C is a schematic diagram of an embodiment of a virtual reality device according to the embodiments of this application. The virtual reality device further includes:

a play module 906, configured to play the target audio file data.

Optionally, in some embodiments of this application, the display module 904 is configured to: render the 3D virtual reality environment based on the target 3D environment model and the at least one piece of target environment data; and display the 3D virtual reality environment.

Optionally, in some embodiments of this application, the matching module 903 is further configured to obtain a running parameter of the smart home device through matching based on the at least one keyword and the preset matching rule; and the sending module 905 is configured to send the running parameter of the smart home device to a server, where the running parameter is used by the server to control the smart home device to run based on the running parameter.

Optionally, in some embodiments of this application, the running parameter includes at least one of a temperature parameter, a humidity parameter, a wind volume parameter, a wind direction parameter, and an odor parameter, where the temperature parameter is used by the server to control the smart home device to run based on the temperature parameter;

the humidity parameter is used by the server to control the smart home device to run based on the humidity parameter;

the wind volume parameter and the wind direction parameter are used by the server to control the smart home device to run based on the wind volume parameter in a wind direction corresponding to the wind direction parameter; and the odor parameter is used by the server to control the smart home device to emit a corresponding odor.

Figure 10:
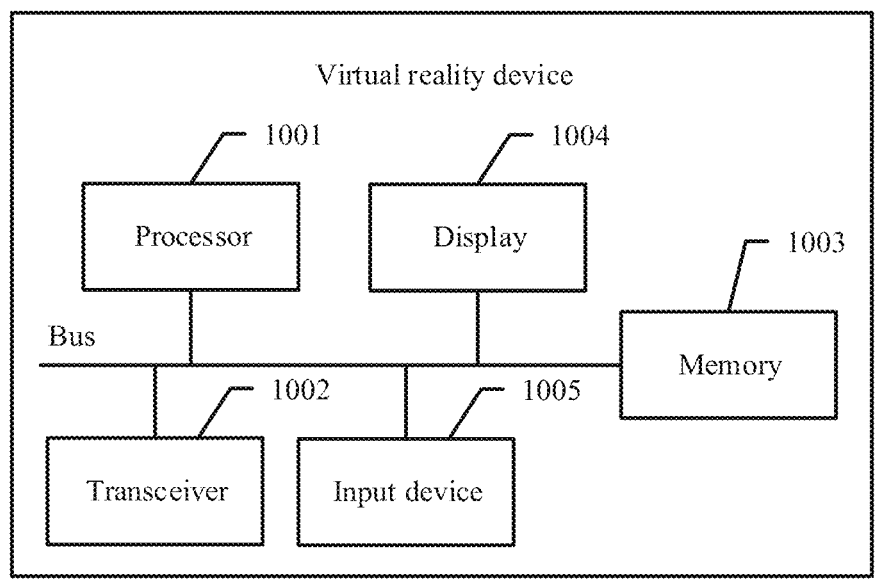
FIG. 10 is a diagram of an embodiment of a virtual reality device according to the embodiments of this application.

The following describes a structure of the virtual reality device in the embodiments of this application. FIG. 10 is a diagram of an embodiment of a virtual reality device according to the embodiments of this application. A virtual reality device 10 may include at least one processor 1001, at least one transceiver 1002, at least one memory 1003, at least one display 1004, and an input device 1005 that are all connected to a bus. The virtual reality device in the embodiments of this application may include more or fewer components than those shown in FIG. 10, may combine two or more components, or may have different component configurations or settings. Each component may be implemented by hardware including one or more signal processors and/or dedicated integrated circuits, by software, or by a combination of hardware and software.

For an embodiment of a virtual apparatus, the processor 1001 can implement functions of the generation module 901, the identification module 902, the matching module 903, and the play module 906 in the virtual reality device in the embodiments shown in FIG. 9A, FIG. 9B, and FIG. 9C. The transceiver 1002 can implement functions of the sending module 905 in the virtual reality device in the embodiment shown in FIG. 9B. The transceiver 1002 may be further used for information exchange between the virtual reality device and a server. The memory 1003 has a plurality of structures and is configured to store a program instruction. The processor 1001 is configured to execute the instruction in the memory 1003 to implement the display method in the embodiment shown in FIG. 7. The display 1004 can implement functions of the display module 904 in the virtual reality device in the embodiments shown in FIG. 9A, FIG. 9B, and FIG. 9C. The input device 1005 may be used by a user to input an operation to the virtual reality device.

All or some of the foregoing embodiments may be implemented by using software, hardware, firmware, or any combination thereof. When software is used to implement the embodiments, some or all of the embodiments may be implemented in a form of a computer program product.

The computer program product includes one or more computer instructions. When the computer program instructions are loaded and executed on a computer, some or all of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A display method, comprising:
    generating, by a virtual reality device, a selection instruction for target content in response to an operation of a user;
    identifying, by the virtual reality device, at least one keyword from the target content according to the selection instruction;
    identifying, by the virtual reality device, a label, a feature, an introduction, and a title of the target content according to the selection instruction to obtain the at least one keyword;
    obtaining, by the virtual reality device, a target three dimensional (3D) environment model and at least one piece of target 3D environment data through matching based on one or more keywords selected by the user from among the at least one keyword identified from the target content and a preset matching rule, wherein the preset matching rule comprises a 3D environment model rule and at least one 3D environment data rule, wherein the at least one 3D environment data rule comprises a material mapping rule;
    in response to a gray material keyword being absent among the one or more keywords selected by the user, selecting, target material mapping data in a colorful mode based on the material mapping rule;
    in response to the gray material keyword being included among the one or more keywords selected by the user, selecting, target material mapping data in a gray mode based on the material mapping rule;
    wherein the gray material keyword describes a negative emotion; and
    applying, by the virtual reality device, the at least one piece of target 3D environment data to the target 3D environment model, to present a corresponding 3D virtual reality environment.

2. The method according to claim 1, wherein the at least one 3D environment data rule comprises at least one of a smart home rule, a skysphere rule, a lighting rule, a particle rule, and a background music rule.

3. The method according to claim 1, wherein the at least one keyword comprises a first target keyword, and the obtaining, by the virtual reality device, the target 3D environment model through matching based on the at least one keyword and the preset matching rule comprises:
    in response to the first target keyword matching the 3D environment model rule, obtaining, by the virtual reality device through matching, a target 3D environment model corresponding to the first target keyword.

4. The method according to claim 2, wherein the at least one piece of target 3D environment data comprises target material mapping data, the at least one keyword comprises a second target keyword, and the obtaining, by the virtual reality device, the at least one piece of target 3D environment data through matching based on the at least one keyword and the preset matching rule comprises:
    in response to the second target keyword matching the material mapping rule, obtaining, by the virtual reality device, the target material mapping data through matching.

5. The method according to claim 2, wherein the at least one 3D environment data rule comprises the skysphere rule, the at least one piece of target 3D environment data comprises target skysphere material data, the at least one keyword comprises a third target keyword, and the obtaining, by the virtual reality device, the at least one piece of target 3D environment data through matching based on the at least one keyword and the preset matching rule comprises:

in response to the third target keyword matching the skysphere rule, obtaining, by the virtual reality device, the target skysphere material data through matching.

6. The method according to claim 2, wherein the at least one 3D environment data rule comprises the lighting rule, the at least one piece of target 3D environment data comprises target lighting data, the at least one keyword comprises a fourth target keyword, and the obtaining, by the virtual reality device, the at least one piece of target 3D environment data through matching based on the at least one keyword and the preset matching rule comprises:

in response to the fourth target keyword matching the lighting rule, obtaining, by the virtual reality device, the target lighting data through matching.

7. The method according to claim 2, wherein the at least one 3D environment data rule comprises the particle rule, the at least one piece of target 3D environment data comprises target particle data, the at least one keyword comprises a fifth target keyword, and the obtaining, by the virtual reality device, the at least one piece of target 3D environment data through matching based on the at least one keyword and the preset matching rule comprises:

in response to the fifth target keyword matching the particle rule, obtaining, by the virtual reality device, the target particle data through matching.

8. The method according to claim 2, wherein the at least one 3D environment data rule comprises the background music rule, the at least one piece of target 3D environment data comprises target audio file data, the at least one keyword comprises a sixth target keyword, and the obtaining, by the virtual reality device, the at least one piece of target 3D environment data through matching based on the at least one keyword and the preset matching rule comprises:

in response to the sixth target keyword matching the background music rule, obtaining, by the virtual reality device, the target audio file data through matching.

9. The method according to claim 8, wherein the method further comprises:

sending, by the virtual reality device, a control instruction to a smart home device, wherein the control instruction comprises the target audio file data, and the target audio file data is played by the smart home device.

10. The method according to claim 9, wherein the method further comprises:

obtaining, by the virtual reality device, a running parameter of the smart home device through matching based on the at least one keyword and the preset matching rule; and sending, by the virtual reality device, the running parameter of the smart home device to a server, wherein the running parameter is used by the server to control the smart home device to run based on the running parameter.

11. A virtual reality device, comprising:

a memory, a transceiver, and a processor, wherein the memory, the transceiver, and the processor are connected through a bus;

the transceiver is configured to communicate with an apparatus other than the virtual reality device;

the memory is configured to store operation instructions; and the processor is configured to invoke the operation instructions, to perform operations comprising:

generating a selection instruction for target content in response to an operation of a user;

identifying at least one keyword from the target content according to the selection instruction;

identifying a label, a feature, an introduction, and a title of the target content according to the selection instruction to obtain the at least one keyword;

obtaining a target three dimensional (3D) environment model and at least one piece of target 3D environment data through matching based on one or more keywords selected by the user from among the at least one keyword identified from the target content and a preset matching rule, wherein the preset matching rule comprises a 3D environment model rule and at least one 3D environment data rule, wherein the at least one 3D environment data rule comprises a material mapping rule;

in response to a gray material keyword being absent among the one or more keywords selected by the user, selecting, target material mapping data in a colorful mode based on the material mapping rule;

in response to the gray material keyword being included among the one or more keywords selected by the user, selecting, target material mapping data in a gray mode based on the material mapping rule;

wherein the gray material keyword describes a negative emotion; and applying the at least one piece of target 3D environment data to the target 3D environment model, to present a corresponding 3D virtual reality environment.

12. The virtual reality device according to claim 11, wherein the at least one 3D environment data rule comprises at least one of a smart home rule, a skysphere rule, a lighting rule, a particle rule, and a background music rule.

13. The virtual reality device according to claim 11, wherein the at least one keyword comprises a first target keyword, and the obtaining the target 3D environment model through matching based on the at least one keyword and the preset matching rule comprises:

in response to the first target keyword matching the 3D environment model rule, the processor is further configured to perform the operations comprising: obtaining, through matching, a target 3D environment model corresponding to the first target keyword.

14. The virtual reality device according to claim 12, wherein the at least one piece of target 3D environment data comprises target material mapping data, the at least one keyword comprises a second target keyword, and the obtaining the at least one piece of target 3D environment data through matching based on the at least one keyword and the preset matching rule comprises:

in response to the second target keyword matching the material mapping rule, the processor is further configured to perform the operations comprising: obtaining the target material mapping data through matching.

15. The virtual reality device according to claim 12, wherein the at least one 3D environment data rule comprises the skysphere rule, the at least one piece of target 3D environment data comprises target skysphere material data, the at least one keyword comprises a third target keyword, and the obtaining the at least one piece of target 3D environment data through matching based on the at least one keyword and the preset matching rule comprises:

in response to the third target keyword matching the skysphere rule, the processor is further configured to perform the operations comprising: obtaining the target skysphere material data through matching.

16. The virtual reality device according to claim 12, wherein the at least one 3D environment data rule comprises the lighting rule, the at least one piece of target 3D environment data comprises target lighting data, the at least one keyword comprises a fourth target keyword, and the obtaining the at least one piece of target 3D environment data through matching based on the at least one keyword and the preset matching rule comprises:

in response to the fourth target keyword matching the lighting rule, the processor is further configured to perform the operations comprising: obtaining the target lighting data through matching.

17. The virtual reality device according to claim 12, wherein the at least one 3D environment data rule comprises the particle rule, the at least one piece of target 3D environment data comprises target particle data, the at least one keyword comprises a fifth target keyword, and the obtaining the at least one piece of target 3D environment data through matching based on the at least one keyword and the preset matching rule comprises:

in response to the fifth target keyword matching the particle rule, the processor is further configured to perform the operations comprising: obtaining the target particle data through matching.

18. The virtual reality device according to claim 12, wherein the at least one 3D environment data rule comprises the background music rule, the at least one piece of target 3D environment data comprises target audio file data, the at least one keyword comprises a sixth target keyword, and the obtaining the at least one piece of target 3D environment data through matching based on the at least one keyword and the preset matching rule comprises:

in response to the sixth target keyword matching the background music rule, the processor is further configured to perform the operations comprising: obtaining the target audio file data through matching.

19. The virtual reality device according to claim 18, wherein the transceiver is configured to perform the operations comprising:

sending a control instruction to a smart home device, wherein the control instruction comprises the target audio file data, and the target audio file data is used to be played by the smart home device.

20. The virtual reality device according to claim 19, wherein the processor is further configured to perform the operations comprising:

obtaining a running parameter of the smart home device through matching based on the at least one keyword and the preset matching rule; and sending the running parameter of the smart home device to a server, wherein the running parameter is used by the server to control the smart home device to run based on the running parameter.

\* \* \* \* \*